(12) United States Patent
Hamel

(10) Patent No.: US 9,348,372 B2
(45) Date of Patent: May 24, 2016

(54) FRICTION HINGE WITH EMBEDDED COUNTERBALANCE

(71) Applicant: Apple Inc., Cupertino, CA (US)

(72) Inventor: Bradley J. Hamel, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 14/304,592

(22) Filed: Jun. 13, 2014

(65) Prior Publication Data

US 2015/0362957 A1    Dec. 17, 2015

Related U.S. Application Data

(63) Continuation of application No. PCT/US2014/042260, filed on Jun. 13, 2014.

(51) Int. Cl.
| | |
|---|---|
| *E05F 1/08* | (2006.01) |
| *G06F 1/16* | (2006.01) |
| *B23P 19/04* | (2006.01) |
| *E05D 7/00* | (2006.01) |

(52) U.S. Cl.
CPC .............. *G06F 1/1681* (2013.01); *B23P 19/048* (2013.01); *E05D 7/00* (2013.01); *G06F 1/1616* (2013.01); *Y10T 16/5389* (2015.01); *Y10T 29/49865* (2015.01)

(58) Field of Classification Search
CPC ...................... Y10T 16/53888; Y10T 16/5389; Y10T 16/5388; Y10T 16/54038; E05Y 2900/606; E05F 1/123; E05D 11/08; E05D 11/082; E05D 11/084; G06F 1/1616; G06F 1/1681; H05K 5/0226
See application file for complete search history.

(56) References Cited

U.S. PATENT DOCUMENTS

| | | | | |
|---|---|---|---|---|
| 17,354 | A * | 5/1857 | Smith ............................ | 16/256 |
| 1,102,556 | A * | 7/1914 | Swartz .................... | E05F 1/123 |
| | | | | 16/308 |
| 2,395,456 | A * | 2/1946 | Bunker ................... | E05F 1/123 |
| | | | | 16/308 |
| 2,504,351 | A * | 4/1950 | Ring ........................ | E05D 5/10 |
| | | | | 16/342 |
| 2,591,476 | A * | 4/1952 | Swanson ............. | E05D 11/1064 |
| | | | | 16/307 |
| 2,867,841 | A * | 1/1959 | Baldauf .................. | E05F 1/123 |
| | | | | 16/308 |
| 3,091,819 | A * | 6/1963 | Wheeler .................. | E05F 3/104 |
| | | | | 16/342 |
| 4,944,481 | A * | 7/1990 | Yurchenco ............. | F16M 11/10 |
| | | | | 16/308 |
| 5,165,145 | A * | 11/1992 | Sherman ............... | G06F 1/1616 |
| | | | | 16/303 |
| 5,228,240 | A * | 7/1993 | Barroero ................. | A47F 3/043 |
| | | | | 16/308 |

(Continued)

OTHER PUBLICATIONS

International Search Report and Written Opinion mailed Feb. 11, 2015 for PCT Application No. PCT/US2014/042260.

*Primary Examiner* — Chuck Mah
(74) *Attorney, Agent, or Firm* — Downey Brand LLP

(57) ABSTRACT

An electronic device such as a portable computer including a base and a lid is provided. The electronic device also includes a hinge assembly that facilitates pivoting movement between the lid and the base. The hinge assembly includes a body and a shaft configured to respective engage one of the base and the lid. The hinge assembly also includes a clutch mechanism. The clutch mechanism may include a friction member that induces friction during movement of the lid to help retain the lid in a user-selected angular position with respect to the base. Further, the clutch mechanism may include a spring that extends through a cavity defined through the shaft. The spring may be affixed to the shaft at one end and affixed to the body at a second end. Thereby, movement of the lid may be assisted or opposed by torsion in the spring, so as to improve a user experience.

17 Claims, 9 Drawing Sheets

(56) References Cited

U.S. PATENT DOCUMENTS

| | | | | |
|---|---|---|---|---|
| 5,253,391 A * | 10/1993 | Ojima | E05F 1/123 | 16/289 |
| 5,382,108 A * | 1/1995 | Ojima | A45C 11/24 | 16/308 |
| 5,393,160 A * | 2/1995 | Ojima | A45C 13/005 | 16/308 |
| 5,515,876 A * | 5/1996 | Warner | A47L 15/4261 | 134/200 |
| 5,533,234 A * | 7/1996 | Bizek | E05F 1/123 | 16/277 |
| 5,566,424 A * | 10/1996 | Crompton | G06F 1/1601 | 16/337 |
| 5,687,509 A * | 11/1997 | Barroero | A47F 3/043 | 16/308 |
| 5,771,540 A * | 6/1998 | Carpenter | G06F 1/1681 | 16/299 |
| 6,061,874 A * | 5/2000 | Tatara | E05F 1/1215 | 16/285 |
| 6,336,252 B1 * | 1/2002 | Bando | F16F 7/06 | 16/307 |
| 6,343,405 B1 * | 2/2002 | Carson | E05F 1/123 | 16/304 |
| 6,494,280 B1 * | 12/2002 | Friend | E05F 1/1033 | 16/308 |
| 8,024,842 B2 | 9/2011 | Shen | | |
| 8,069,535 B2 | 12/2011 | Tang | | |
| 2002/0002884 A1 * | 1/2002 | Eromaki | G06F 1/1616 | 82/117 |
| 2002/0069483 A1 * | 6/2002 | Savolainen | G06F 1/1616 | 16/308 |
| 2002/0133907 A1 * | 9/2002 | Oshima | F16C 11/10 | 16/321 |
| 2002/0162192 A1 * | 11/2002 | Su-Man | G06F 1/1616 | 16/337 |
| 2003/0025352 A1 * | 2/2003 | Duffy | B60P 3/39 | 296/146.1 |
| 2004/0049883 A1 * | 3/2004 | Huang | G06F 1/1616 | 16/295 |
| 2004/0049887 A1 * | 3/2004 | Lu | G06F 1/1616 | 16/342 |
| 2005/0198777 A1 * | 9/2005 | Mabe | E05D 5/10 | 16/308 |
| 2007/0022569 A1 | 2/2007 | Luo | | |
| 2007/0163373 A1 * | 7/2007 | Tu | G06F 1/1616 | 74/409 |
| 2007/0234516 A1 | 10/2007 | Sung | | |
| 2009/0025181 A1 * | 1/2009 | Burger | E05F 1/1215 | 16/286 |
| 2009/0083943 A1 * | 4/2009 | Chen | G06F 1/1681 | 16/342 |
| 2009/0133219 A1 * | 5/2009 | Lowry | E05D 11/082 | 16/304 |
| 2009/0260187 A1 * | 10/2009 | Wang | G06F 1/1616 | 16/307 |
| 2010/0088853 A1 | 4/2010 | Degner et al. | | |
| 2011/0185536 A1 * | 8/2011 | Costabel | E05F 1/1207 | 16/2.1 |
| 2011/0293356 A1 * | 12/2011 | Billings | G06F 1/1681 | 403/2 |
| 2012/0005861 A1 * | 1/2012 | Homner | E05F 1/1215 | 16/308 |
| 2012/0023703 A1 | 2/2012 | Duan et al. | | |
| 2013/0074287 A1 * | 3/2013 | Franchini | E05D 11/105 | 16/292 |
| 2013/0286578 A1 | 10/2013 | Degner et al. | | |
| 2013/0342974 A1 | 12/2013 | Hung et al. | | |
| 2014/0026363 A1 | 1/2014 | Novin | | |

\* cited by examiner

FRICTION HINGE WITH EMBEDDED COUNTERBALANCE

CROSS-REFERENCE TO RELATED APPLICATION

This application is a continuation of International Application No. PCT/US14/42260, with an international filing date of Jun. 13, 2014, entitled "FRICTION HINGE WITH EMBEDDED COUNTERBALANCE," which is incorporated herein by reference in its entirety.

FIELD

The present disclosure relates generally to hinge assemblies and more particularly to hinge assemblies for an electronic device.

BACKGROUND

Electronic devices such as portable computers typically include a housing having an upper portion and a lower portion, which may also be respectively referred to as a lid and a base. The lid and the base may be connected by a hinge. The base typically contains components such as printed circuit boards, disk drives, a keyboard, and a battery. The lid typically contains a display. When the portable computer is in an open configuration, the lid may be positioned substantially vertically and substantially at a right angle with respect to the base such that the display is visible to the user of the portable computer. When the portable computer is closed, the lid lies substantially flat against the base. The closed configuration protects the display and keyboard and facilitates transport of the portable computer.

The design of hinges for portable computers presents certain challenges. In this regard, it is generally desirable to include a clutch mechanism in a hinge assembly that holds the lid at a selected angular position with respect to the base while still allowing for easy manipulation of the lid relative to the base. A hinge with an overly stiff clutch mechanism may require a user of the portable computer to use undesirably large amounts of force to pry apart the lid from the base. Stiff clutch mechanisms may resist opening to such an extent that the entire portable computer will be lifted upwards if a user attempts to open the portable computer by lifting the lid using only one hand. To address these concerns, clutch mechanisms may be made that are less stiff. Although clutch mechanisms designed in this manner may facilitate opening of the portable computer, they may not always prevent unintended movement of the upper housing relative to the lower housing.

Further, in the production of portable computers, compact design thereof is frequently sought after. In this regard, even relatively small components are undergoing scrutiny in terms of the size thereof.

SUMMARY

An electronic device such as a portable computer is provided. The portable computer may include a base and a lid. The base and the lid may be hingedly coupled by a hinge assembly.

The hinge assembly may include a body that engages the base and a shaft that engages the lid, or vice versa. The hinge assembly may include a clutch mechanism that affects forces associated with opening and closing the lid. Thereby, a user experience may be improved.

The hinge assembly may include a clutch mechanism. The clutch mechanism may include a friction member that causes friction during rotation of the lid. Further, the clutch mechanism may include a spring. The spring may be configured to assist or counter movement of the lid in certain instances.

The spring may include a torsion bar that extends through a cavity defined through the shaft. The torsion bar may be affixed to the shaft at one end and affixed to the body at the other end. For example, a fixation member may couple a second end of the torsion bar to the body. Thereby, the torsion bar may impart force during rotation of the lid.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, assemblies, methods, and systems. These drawings in no way limit any changes in form and detail that may be made to the disclosure by one skilled in the art without departing from the spirit and scope of the disclosure.

DETAILED DESCRIPTION

Representative applications of systems, apparatuses, computer program products and methods according to the presently described embodiments are provided in this section.

These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described in detail below, the following relates to hinge assemblies for electronic devices such as portable computers, which include a lid and a base. The hinge assembly may include a body and a shaft that respectively engage one of the base and the lid. Thereby, the hinge assembly may facilitate movement of the lid with respect to the base.

In this regard, the hinge assembly may include a friction member configured to create friction during rotation of the lid with respect to the base. For example, the friction member may be affixed to the body and configured to friction engage the shaft, which rotates during hinged movement of the lid. Accordingly, the friction member may assist in maintaining the lid in a user-selected position.

Further, the clutch mechanism may include a spring, which may increase or decrease the force associated with pivoting the lid. The spring may extend through a cavity defined along a rotational axis of the shaft. In this regard, the spring may be affixed to the shaft at a first end and coupled to the body at a second end that extends out of the shaft. Accordingly, the spring functions as a torsion bar that saves space by being positioned largely within the cavity of the shaft.

These and other embodiments are discussed below with reference to the figures. However, those skilled in the art will readily appreciate that the detailed description given herein with respect to these figures is for explanatory purposes only.

Figure 1:
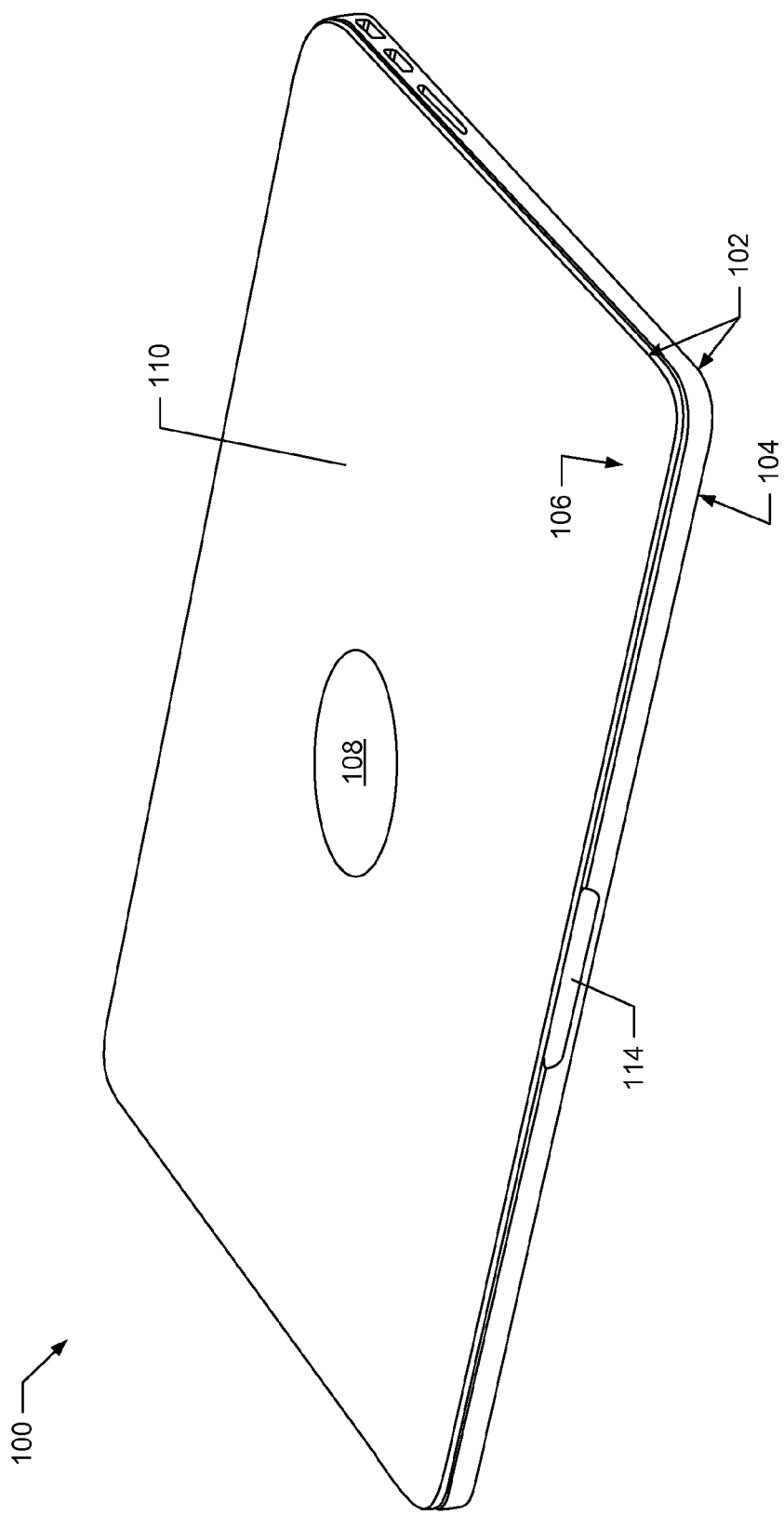
FIG. 1 illustrates a front perspective view of an electronic device, the electronic device being embodied as a portable computer and including a housing including a base and a lid positioned in a closed configuration according to an example embodiment of the present disclosure.

FIG. 1 shows an electronic device 100 (e.g., a portable computer, such as a laptop computer) in which embodiments of a hinge assembly may be included. More particularly, FIG. 1 shows a front facing perspective view of the electronic device 100 in a closed configuration. As illustrated, the electronic device 100 may include a housing 102 having a base 104, which may also be referred to as a lower portion or a main unit, and a lid 106, which may also be referred to as an upper portion or a cover.

In the closed configuration, the lid 106 and the base 104 may form what appears to be a uniform structure having a continuously varying and coherent shape that enhances both the look and feel of the electronic device 100. The electronic device 100 may include a logo 108 at a rear case 110 of the lid 106 of the housing 102. In one embodiment, the logo 108 can be illuminated by light emitted from a display (shown later).

The base 104 can be pivotally connected to the lid 106 to allow for opening and closing of the electronic device. Accordingly, the lid 106 of the housing 102 can be moved with respect to the base 104 of the housing from a closed position (shown in FIG. 1) to an open position.

Figure 2:
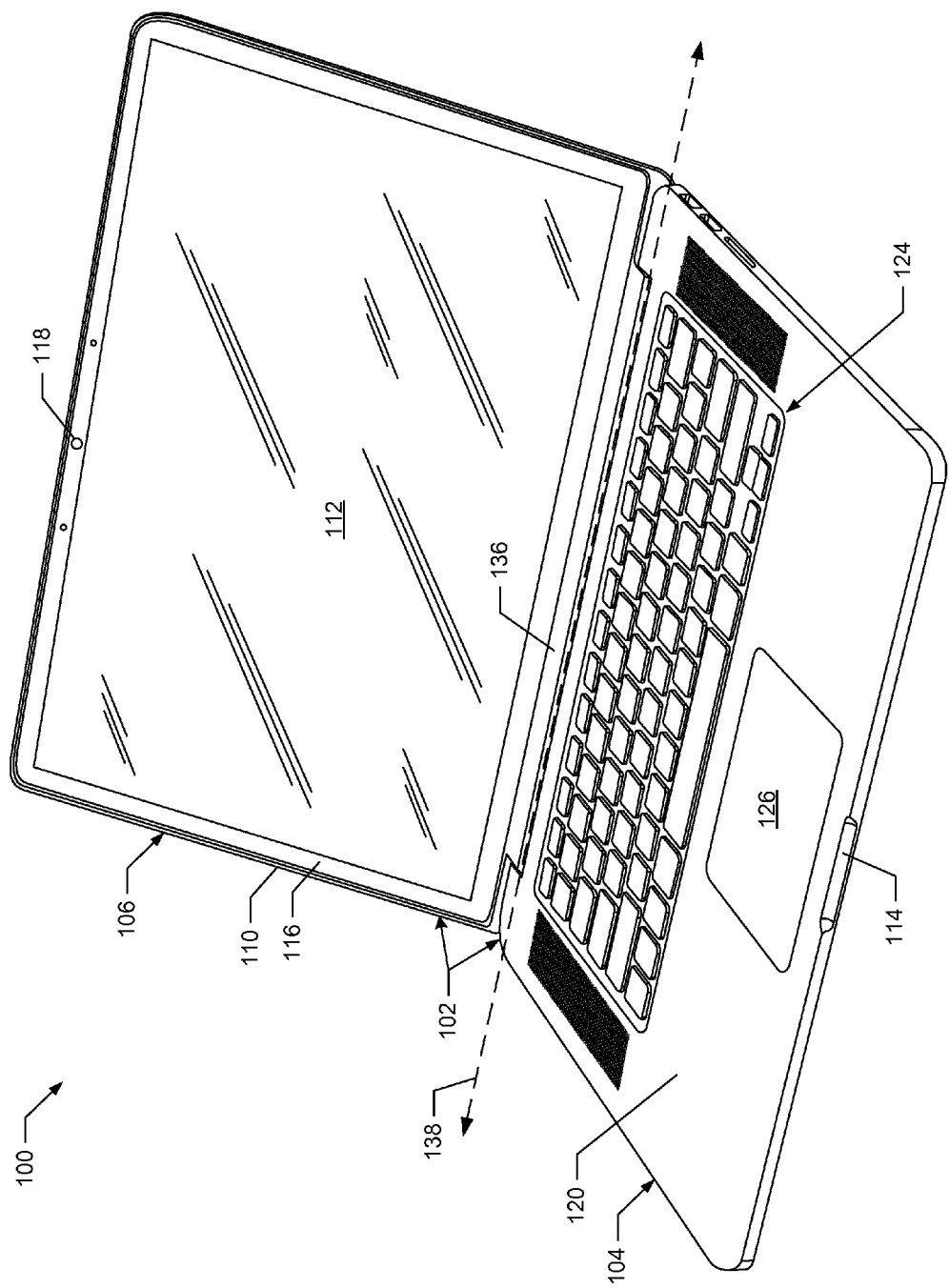
FIG. 2 illustrates a front perspective view of the electronic device of FIG. 1 wherein the base and the lid are positioned in an open configuration according to an example embodiment of the present disclosure.

FIG. 2 illustrates a front facing perspective view of the electronic device 100 in the open configuration. The display 112 may be coupled to the rear case 110 of the lid 106 such that the display is provided with structural support. In this regard, the lid 106 can be formed to have uni-body construction provided by the rear case 110 that can provide additional strength and resiliency to the lid which is particularly important due to the stresses caused by repeated opening and closing occurring during normal use. In addition to the increase in strength and resiliency, the uni-body construction of the lid 106 can reduce an overall part count by eliminating separate support features, which may decrease manufacturing cost and/or complexity.

The lid 106 may include a mask (also referred to as display trim) 116 that surrounds the display 112. The display trim 116 can be formed of an opaque material such as ink deposited on top of or within a protective layer of the display 112. Thus, the display trim 116 can enhance the overall appearance of display 112 by hiding operational and structural components as well as focusing attention onto the active area of the display. Also, the electronic device 100 may include a logo 108 at a rear case 110 of the lid 106 of the housing 102. In one embodiment, the logo 108 can be illuminated by light emitted from a display 112. Also, the lid 106 may be couple to a chin 136. The lid 106 and chin 136 may rotate relative to the base 104 in order open or close the electronic device 136. The chin 136 may be couple to a hinge assembly (discussed later) in order to perform the relative rotation.

The display 112 can display visual content such as a graphical user interface, still images such as photos as well as video media items such as movies. The display 112 can display images using any appropriate technology such as a liquid crystal display (LCD), a light emitting diode (LED) display, an organic light emitting diode (OLED) display, etc. Further, the electronic device 100 may include an image capture device 118. In one embodiment the image capture device 118 may be located on a transparent portion of the display trim 116. The image capture device 118 can be configured to capture both still and video images in some embodiments.

Figure 3:
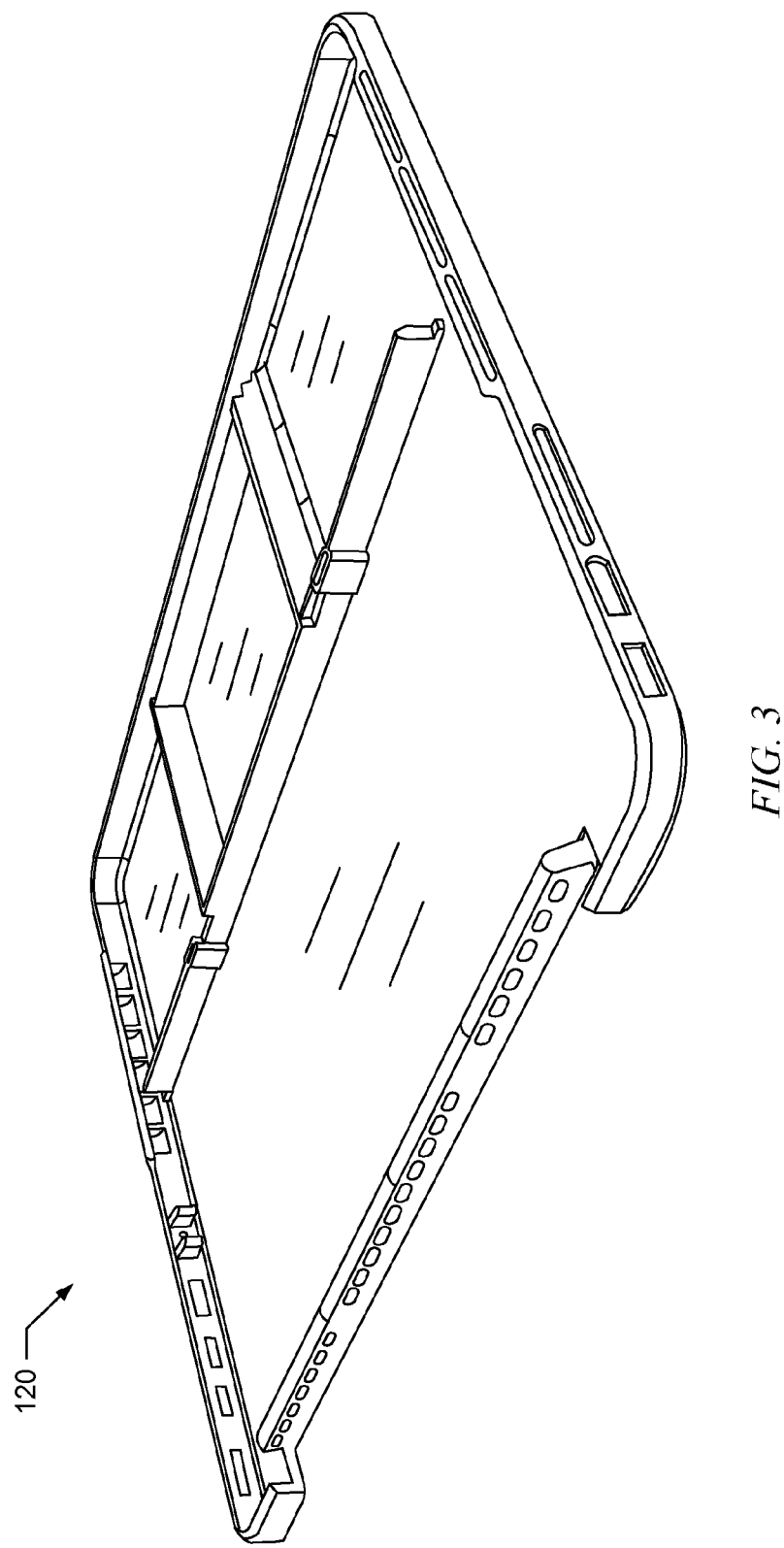
FIG. 3 illustrates a perspective top view of a top case of the base of the electronic device of FIG. 1 according to an example embodiment of the present disclosure.

The base 104 may include a top case 120. As illustrated in FIG. 2, the top case 120 can be configured to accommodate various user input devices such as a keyboard 124 and a touchpad 126. In particular, these user input devices may be exposed such that a user may interact therewith when the electronic device is positioned in the open configuration. A perspective view of top case 120 showing an inner portion of top case 120 is shown in FIG. 3.

Further, the base 104 may include a bottom case (shown later). The top case 120 and the bottom case of the base 104 may cooperate to receive various other electronic and mechanical components therebetween. As may be understood, by way of example, the electronic components may include a mass storage device (e.g., a hard drive or a solid state storage device such as a flash memory device including non-transitory and tangible memory that may be, for example, volatile and/or non-volatile memory) configured to store information, data, files, applications, instructions or the like, a processor (e.g., a microprocessor or controller) configured to control the overall operation of the portable electronic device, a communication interface configured for transmitting and receiving data through, for example, a wired or wireless network such as a local area network (LAN), a metropolitan area network (MAN), and/or a wide area network (WAN), for example, the Internet, a fan, a heat pipe, and one or more batteries.

Figure 4:
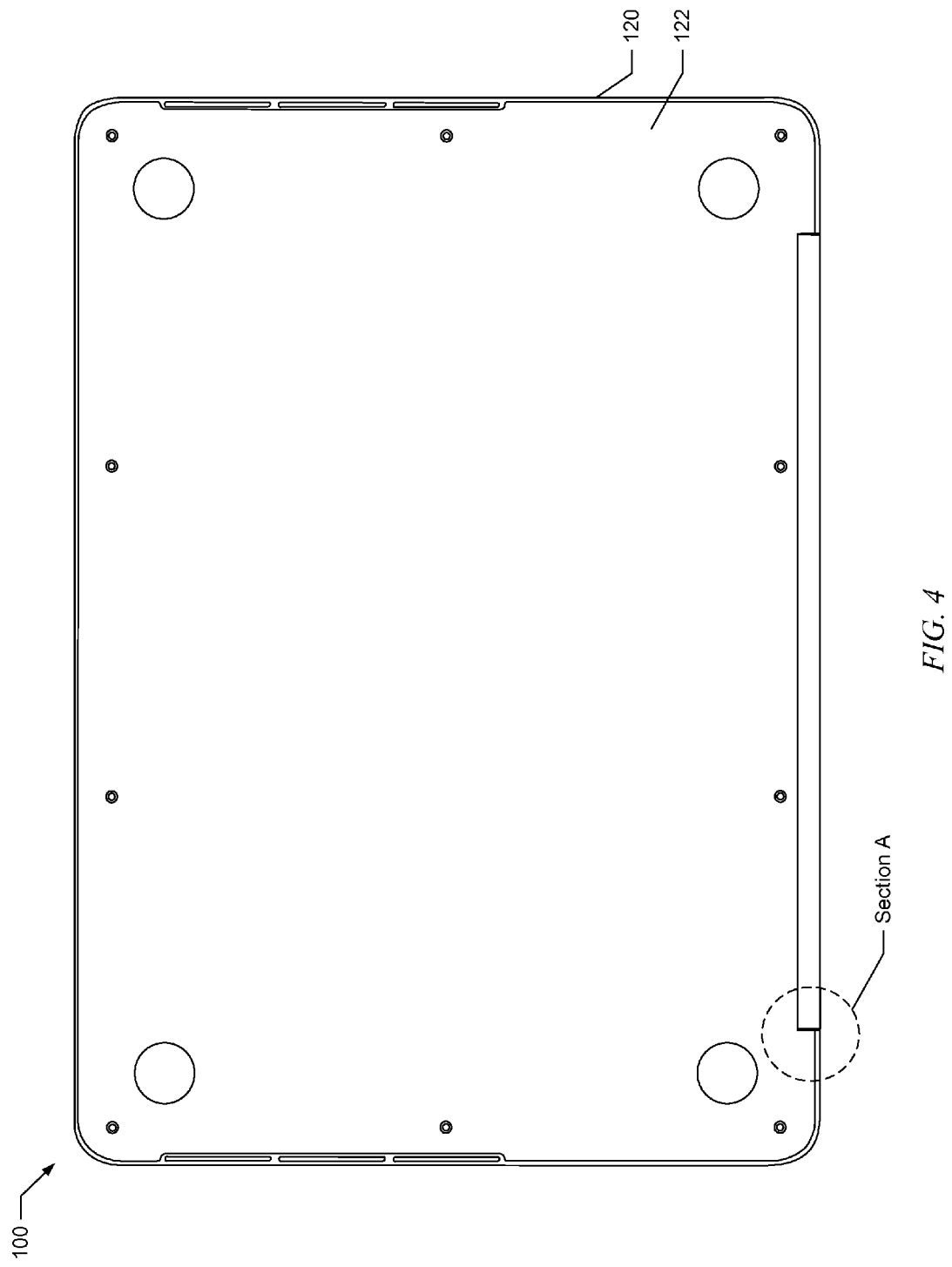
FIG. 4 illustrates a bottom view of the electronic device of FIG. 1 showing a bottom case thereof coupled to the top case according to an example embodiment of the present disclosure.
Figure 5:
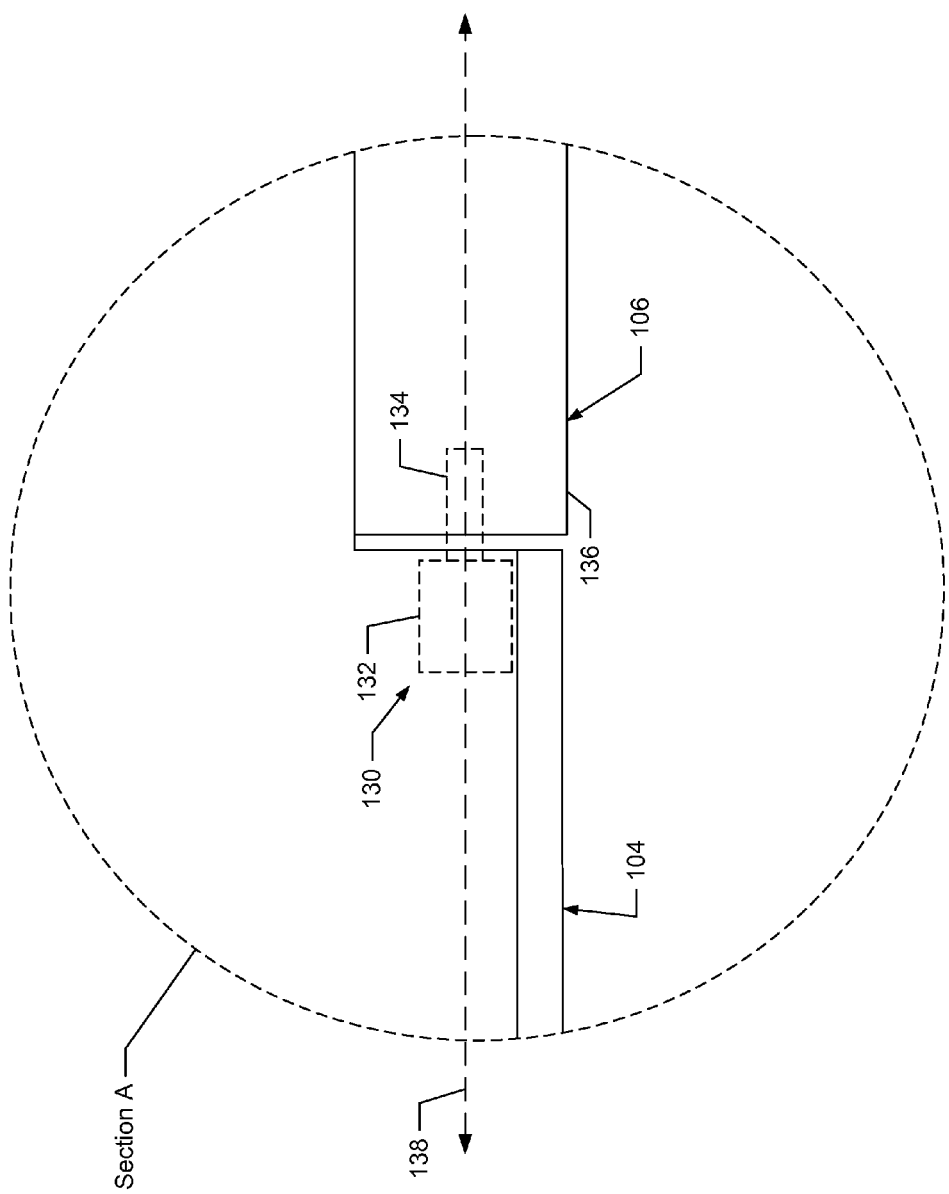
FIG. 5 illustrates an enlarged schematic view of Section A from FIG. 4 showing a hinge assembly coupled to the lid and the base of the electronic device according to an example embodiment of the present disclosure.

FIG. 4 illustrates a bottom view of the electronic device 100 showing the bottom case 122 coupled to the top case 120. In some embodiments a hinge assembly may be coupled to the base 104 and the lid 106, and located in an area denoted as Section A. FIG. 5 illustrates an enlarged view of Section A from FIG. 4.

In this regard, by way of example, the hinge assembly 130 may include a body 132 and a shaft 134. The body 132 of the hinge assembly 130 may be coupled to the base 104. Thus, for example, the body 132 of the hinge assembly 130 may be received between the top case 120 and the bottom case 122 (see, e.g., FIG. 4). Further, the shaft 134 may be coupled to the lid 106. In this regard, the shaft 134 may engage a chin 136 of the lid 106. However, as may be understood, the hinge assembly 130 may hingedly couple the base 104 and the lid 106 in a variety of other manners.

The hinge assembly 130 may facilitate opening and closing of the lid 106 relative to the base 104 by allowing relative rotation therebetween about a rotational axis 138. In this regard, the hinge assembly 130 may provide friction and stabilizing forces that allow a user to smoothly open and close the lid 106 of the electronic device 100. A satisfactory hinge assembly 130 is not excessively resistive. A hinge assembly that is overly resistive will make it difficult to open lid 106 of housing 102 smoothly. For example, a stiff hinge assembly may cause the base 104 to lift up from a table top as a user attempts to lift the lid 106. At the same time, a weak hinge assembly will not be satisfactory. If a hinge assembly is too weak, small disturbances may cause lid 106 to slam shut or fall further open.

Accordingly, embodiments of hinge assemblies may include clutch mechanisms configured to facilitate easy opening of a lid while also substantially preventing unintended movement of the lid relative to the base. Such clutch mechanisms may include one or more friction members configured to resist relative movement between the lid and base. In this regard, the friction members may employ friction to resist movement of the lid.

Further, such clutch mechanisms may include a spring that provides force configured to assist and/or resist movement of the lid relative to the base during certain instances. For example, the spring may counteract gravity during an opening motion to facilitate opening of the electronic device and act as a counterbalance. The force provided by the spring may also cause the required forces associated with opening and/or closing the electronic device to be substantially even across the stroke regardless of the angular position of the lid with respect to the base. Alternatively, the spring may define a neutral position when the lid is at approximately a ninety degree angle with respect to the base, at which the spring applies no force between the lid and base. As may be understood, the spring may be particularly configured to provide force either assisting or countering movement of the lid across the strokes associated with opening and closing the lid in any of a variety of manners as may be desired. Further, the spring may be particularly sized and configured to provide a desired magnitude of force.

However, such clutch mechanisms tend to undesirably increase the size of hinge assemblies. Further, existing embodiments of clutch mechanisms may include a helical torsion spring, which may be expensive to manufacture. Accordingly, advances with respect to decreasing the size of hinge assemblies may be desirable. Further, it may be desirable to avoid usage of helical torsion springs.

Figure 6:
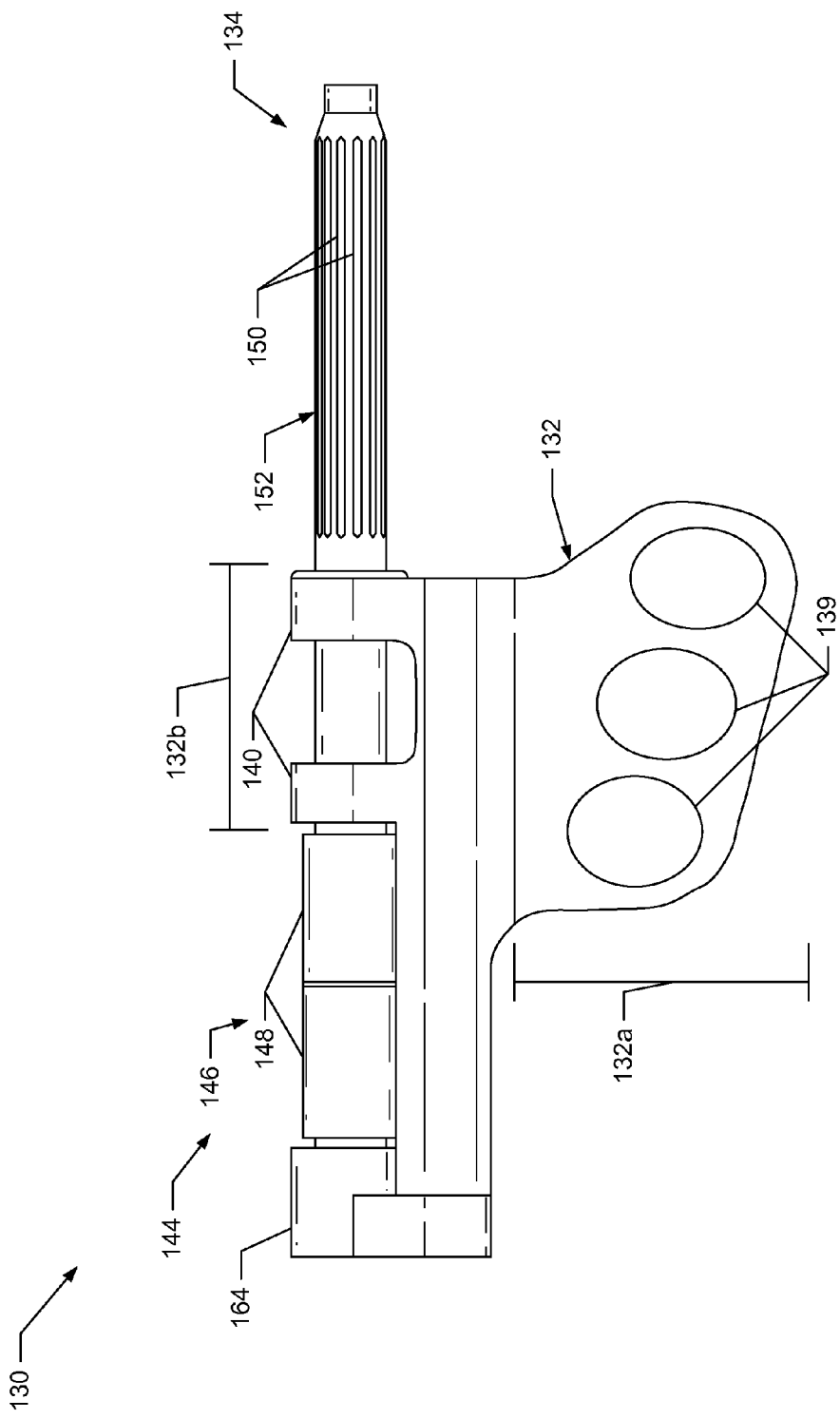
FIG. 6 illustrates an enlarged side view of the hinge assembly of FIG. 5 according to an example embodiment of the present disclosure.

In this regard, FIG. 6 illustrates a top view of the hinge assembly 130 of FIG. 5. As noted above, the hinge assembly 130 includes a body 132 configured to engage a base of an electronic device, such as the base 104 of the electronic device (see, e.g., FIG. 5). As further noted above, the hinge assembly 130 includes a shaft 134 configured to engage a lid of an electronic device, such as the lid 106 of the electronic device (see, e.g., FIG. 5). In this regard, note that while the hinge assembly 130 is generally described in terms of inclusion in the electronic device 100 (see, e.g., FIG. 2), the hinge assembly 130 may be employed in various other embodiments of electronic devices including a base and a lid in other embodiments.

The body 132, the shaft 134, and various other components of the hinge assembly 130 may include relatively high strength materials such as steel. The body 132 may include a base engagement portion 132a configured to engage the base 104 of the electronic device 100 (see, e.g., FIG. 5). As illustrated, in on embodiment the base engagement portion 132a of the body 132 may include one or more apertures 139. The apertures 139 may be configured to receive fasteners (e.g., screw, bolts, or pins) therethrough in order to couple the base engagement portion 132a of the body 132 to the base 104 of the electronic device (see, e.g., FIG. 5). However, various other attachment mechanisms and methods may be employed to affix the base engagement portion 132a of the body 132 to the base 104 of the electronic device (see, e.g., FIG. 5). For example, welding or adhesives may be employed in other embodiments.

Further, the body 132 may include a shaft engagement portion 132b engaged with the shaft 134. The shaft engagement portion 132b of the body 132 may be configured to allow rotation of the shaft 134 with respect thereto. As illustrated, in one embodiment the shaft engagement portion 132b of the body 132 may include first and second guides 140.

Figure 7:
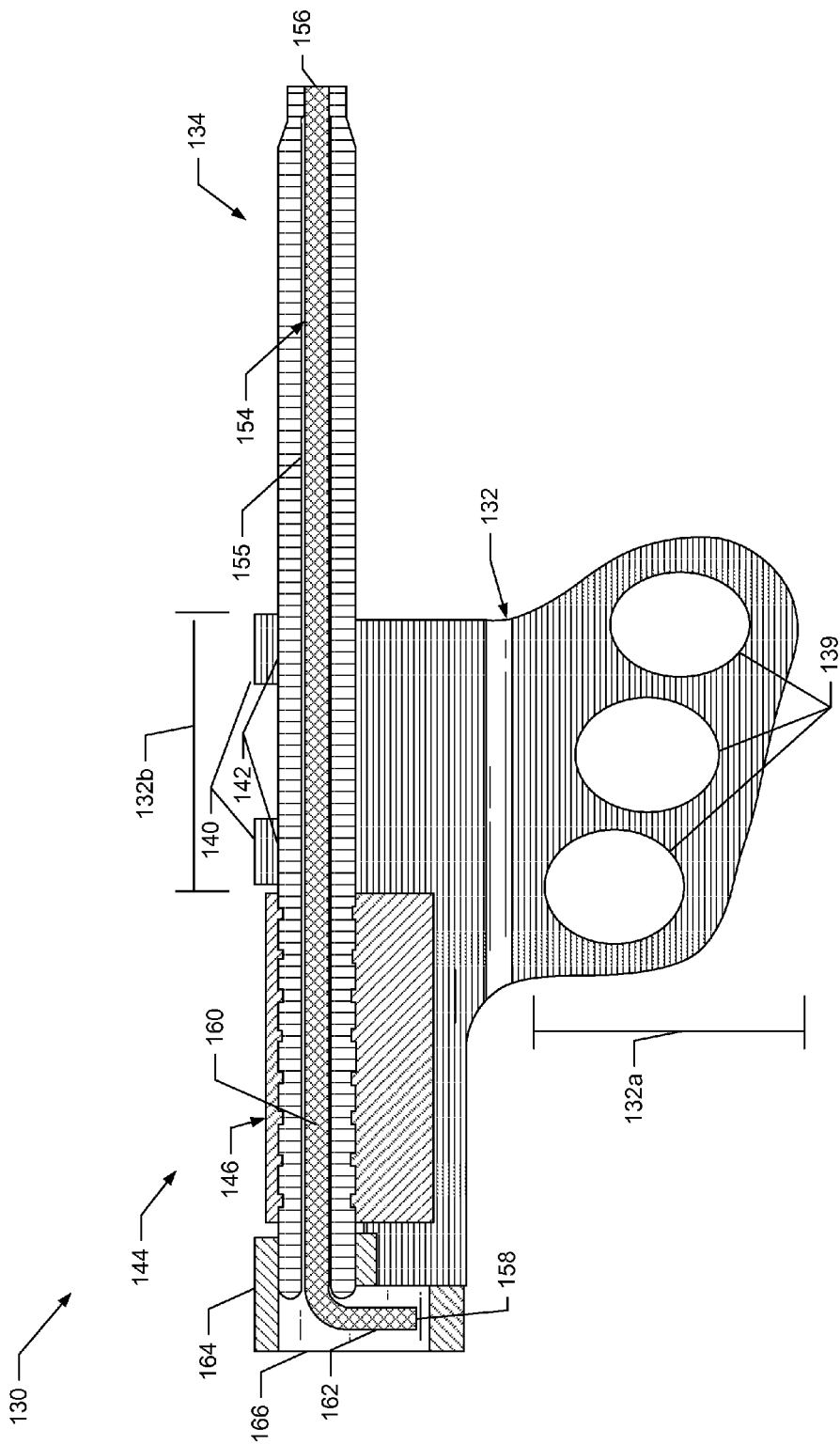
FIG. 7 illustrates an enlarged sectional view through the hinge assembly of FIG. 5 according to an example embodiment of the present disclosure.

FIG. 7 illustrates a sectional view through the hinge assembly 130. As illustrated, the guides 140 may include axially aligned apertures 142. The axially aligned apertures 142 may receive the shaft 134 therethrough and substantially freely allow for rotation thereof. However, in other embodiments a greater or smaller number of guides may be employed. Thus, by way of further example, in one embodiment the shaft engagement portion may include a single guide having one aperture extending therethrough configured to receive the shaft.

As illustrated in FIG. 6, the hinge assembly 130 may further include a clutch mechanism 144. The clutch mechanism 144 may be configured to affect rotation of the lid 106 with respect to the base 104 (see, e.g., FIG. 2) so as to improve a user experience. In this regard, in one embodiment the clutch mechanism 144 may include a friction member 146.

The friction member 146 may be coupled to one of the shaft 134 and the body 132 and configured to provide frictional engagement therebetween. In this regard, in one embodiment the friction member 146 may include first and second clips 148 coupled to the body 132 and extending at least partially around, and in engagement with, the shaft 134, as illustrated in FIG. 6. Thus, as the shaft 134 rotates, the clips 148 rub against and frictionally engage the shaft 134 while remaining substantially stationary with respect to the body 132. In another embodiment the clips may be coupled to the shaft and configured to frictionally engage the body. Further, a greater or smaller number of the clips may be employed in other embodiments. Alternatively, the body may integrally define the friction member. In this regard, by way of example, the guides may be configured to frictionally engage the shaft, rather than substantially freely allowing rotation of the shaft therein, or a separate portion of the body may contact the shaft so as to produce friction therebetween.

Regardless of the particular configuration of the friction member 146, the friction member 146 may cause friction between the shaft 134 and the body 132 that resists rotation of the shaft with respect to the body. Accordingly, the friction member 146 may resist rotation of the lid 106 with respect to the base 104 (see, e.g., FIG. 2). In this regard, the shaft 134 may be configured to engage the lid 106 (see, e.g., FIG. 5) such that the shaft rotates when the lid is rotated with respect to the base (see, e.g., FIG. 5).

Thus, by way of example, the shaft 134 may include a plurality of splines 150 at an outer surface 152 thereof, as illustrated in FIG. 6. For example, the shaft 134 may be pressed into engagement with the chin 136 of the lid 106 (see, e.g., FIG. 5). Thereby, the splines 150 may engage the chin 136, causing firm engagement between the lid 106 (see, e.g., FIG. 5) and the shaft 134, which substantially prevents rotation therebetween. Accordingly, when the friction member 146 resists rotation of the shaft 134 in the manner described above, the friction member 146 also resists rotation of the lid 106 (see, e.g., FIG. 5) in order to prevent accidental opening and closing thereof and provide other benefits as described elsewhere herein.

The clutch mechanism 144 may additionally include a spring 154 in some embodiments. The spring 154 may be configured to provide a force that either opposes or assists opening or closing of the lid 106 relative to the base 104 (see, e.g., FIG. 2), as described elsewhere herein. As noted above, some embodiments of clutch mechanisms included helical coil springs. However, it may be relatively expensive to manufacture such springs. Further such springs may typically be disposed on an outside of the shaft that engages the lid. Accordingly, in these embodiments, the shaft may be elongated and extend further into the base of the housing of the electronic devices in order for the spring to be positioned thereabout inside the base. Thus, embodiments of hinge assemblies including helical torsion springs may define a relatively long length as a result of the lengthened shaft and helical torsion spring placed thereabout. Further, use of a helical torsion spring extending about the shaft may result in the helical torsion spring exposed to the surrounding environment within the electronic device. Thereby, it may be necessary to design the electronic device to not include any wires, ribbons, insulation or other components in proximity to the hinge assembly to ensure that the spring does not come in contact therewith.

Thus, for the various reasons described above, the spring 154 included in the hinge assembly 130 of the present disclosure does not include a helical torsion spring. Rather, as illustrated in FIG. 7, the spring 154 includes a torsion bar. In this regard, the shaft defines a cavity 155 extending at least partially therethrough along a longitudinal length thereof. In the illustrated embodiment the cavity 155 extends along an entirety of the length of the shaft 134. The spring 154 may be at least partially received in the cavity 155 of the shaft 134.

The spring 154 extends between a first end 156 and a second end 158. Further, the spring 154 may define a major portion 160 and an angled portion 162. The major portion 160 may extend from the first end 156 to the angled portion 162. The angled portion 162 may extend from the second end 158 to the major portion 160. The major portion 160 may be substantially entirely disposed in the cavity 155 of the shaft 134, whereas the angled portion 162 may extend out of the cavity of the shaft. The angled portion 162 may extend substantially perpendicularly to the major portion 160 or otherwise define an angle with respect to the major portion, which may linearly extend through the cavity 155.

The spring 154 may be affixed to the shaft 134 at the first end 156 thereof. For example, the first end 156 of the spring 154 may be welded, brazed, crimped, bent (e.g., into contact with a slot in the shaft 134), swaged (e.g., such that the shaft and the spring each define the same non-circular shape, such as a square), or otherwise affixed in other manners such that the first end of the spring may not rotate with respect to the shaft.

Further, the second end 158 of the spring 154 may be affixed to the body 132. In the illustrated embodiment the hinge assembly 130 further includes a fixation member 164 coupled to the body 132 and the second end 158 of the spring 154. In this regard, the fixation member 164 may be welded or otherwise affixed to the body 132 such that movement thereof with respect to the body 132 is prevented. Further, the second end 158 of the spring 154 may be affixed to the fixation member 164 in a variety of manners. For example, the fixation member 164 may define a slot 166 in which the angled portion 162 is received, as illustrated in FIG. 7. Accordingly, by affixing the fixation member 164 to the body 132 and restraining movement of the angled portion 162 of the spring 154 with the fixation member 164, movement of the second end 158 of the spring 154 may be substantially avoided.

Thus, the shaft 134 and thereby the first end 156 of the spring 154 may rotate during pivoting movement of the lid 106 relative to the base 104 (see, e.g., FIG. 2), as a result of the first end of the spring being affixed to the shaft. However, as a result of the angled portion 162 of the spring 154 being affixed to the body 132 via the fixation member 164 or other fixation methods and mechanisms, the second end 158 of the spring may remain substantially stationary during pivoting movement of the lid 106 relative to the base 104 (see, e.g., FIG. 2). Accordingly the spring 154 may be subjected to torsion during pivoting movement of the lid 106 relative to the base 104 (see, e.g., FIG. 2). Thus, the major portion 160 of the spring 154 may include a torsion bar.

As a result of employing the above-described configuration, the overall size of the hinge assembly 130 may be reduced relative to comparable embodiments of spring assemblies employing helical torsion springs. In particular, a longitudinal length of the hinge assembly 130 extending along the rotational axis of the shaft 134 may be reduced. Accordingly, the electronic device in which the hinge assembly 130 is positioned may define a reduced size or additional components may be positioned therein. Further, it is noted that employing the shaft 134 having the cavity 155 defined therethrough only marginally reduces the strength of the shaft. In this regard, the majority of the stiffness of the shaft 134 is defined by the radially outward portions thereof. Accordingly, the shaft 134 defining a hollow configuration with the cavity 155 extending therethrough may be configured to define the same stiffness as a solid shaft by only slightly increasing the diameter or other cross-sectional dimension thereof in non-cylindrical embodiments.

Figure 8:
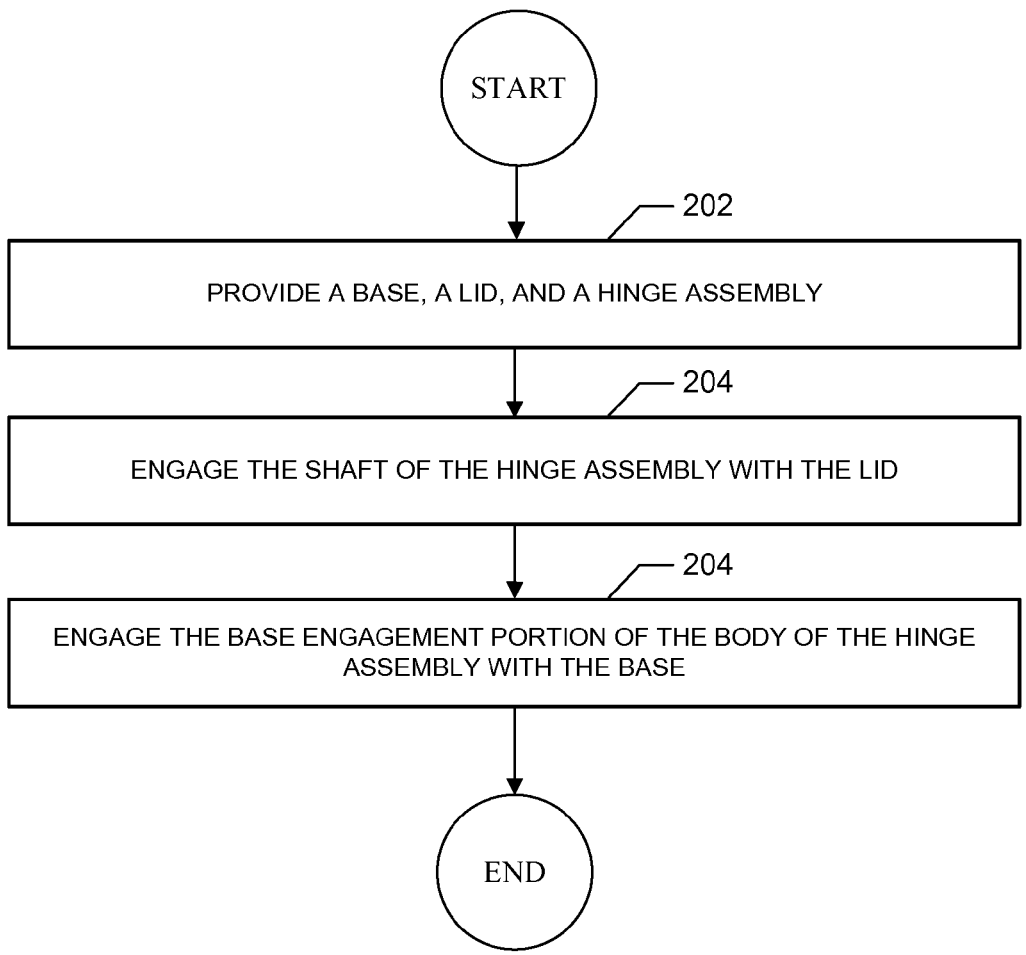
FIG. 8 schematically illustrates a method for assembling an electronic device according to an example embodiment of the present disclosure.

A method for assembling an electronic device such as the electronic device (see, e.g., FIG. 2) is also provided. As illustrated in FIG. 8, the method may include providing a base, a lid, and a hinge assembly at operation 202. The hinge assembly may include a shaft defining a cavity extending at least partially therethrough along a longitudinal length thereof. Further, the hinge assembly may include a body including a base engagement portion and a shaft engagement portion. The shaft engagement portion may be engaged with the shaft and configured to allow rotation of the shaft with respect thereto. The hinge assembly may additionally include a spring extending between a first end and a second end and at least partially received in the cavity of the shaft. In some embodiments, at least a portion of the spring is a torsion bar. Further, the method may include engaging the shaft of the hinge assembly with the lid at operation 204. The method may also include engaging the base engagement portion of the body of the hinge assembly with the base at operation 206.

In some embodiments the method may further include affixing the first end of the spring to the shaft. The method may additionally include affixing the second end of the spring to the body. Affixing the second end of the spring to the body may include coupling a fixation member to the second end of the spring and the body. Coupling the fixation member to the spring may include coupling the fixation member to an angled portion of the spring extending out of the cavity of the shaft.

Further, the method may include coupling a friction member to one of the shaft and the body. The friction member may be configured to provide frictional engagement therebetween. Engaging the shaft of the hinge assembly with the lid at operation 204 may include engaging a plurality of splines extending from an outer surface of the shaft with the lid.

Figure 9:
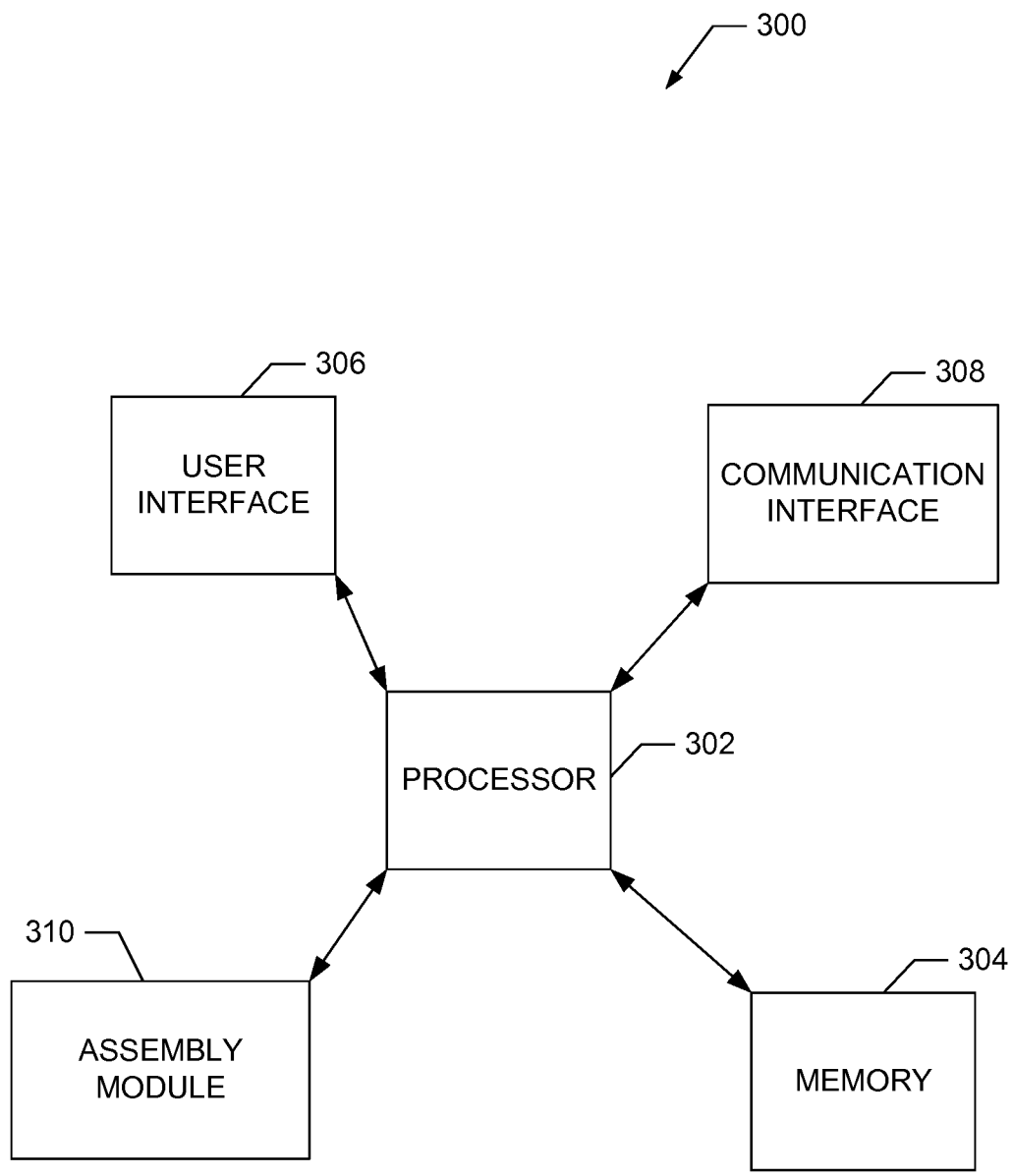
FIG. 9 schematically illustrates a block diagram of an electronic device according to an example embodiment of the present disclosure.

FIG. 9 is a block diagram of an electronic device 300 suitable for use with the described embodiments. In one example embodiment the electronic device 300 may be embodied in or as a controller configured for controlling assembly operations as disclosed herein. In this regard, the electronic device 300 may be configured to control or execute the above-described assembly operations for the electronic device 100 embodied as a portable computer (see, e.g., FIG. 2).

The electronic device 300 illustrates circuitry of a representative computing device. The electronic device 300 may include a processor 302 that may be microprocessor or controller for controlling the overall operation of the electronic device 300. In one embodiment the processor 302 may be particularly configured to perform the functions described herein relating to assembling a portable computer. The electronic device 300 may also include a memory device 304. The memory device 304 may include non-transitory and tangible memory that may be, for example, volatile and/or non-volatile memory. The memory device 304 may be configured to store information, computer program code, data, files, applications, instructions or the like. For example, the memory device 304 could be configured to buffer input data for processing by the processor 302. Additionally or alternatively, the memory device 304 may be configured to store instructions for execution by the processor 302.

The electronic device 300 may also include a user interface 306 that allows a user of the electronic device 300 to interact with the electronic device. For example, the user interface 306 can take a variety of forms, such as a button, keypad, dial, touch screen, audio input interface, visual/image capture input interface, input in the form of sensor data, etc. Still further, the user interface 306 may be configured to output information to the user through a display, speaker, or other output device. A communication interface 308 may provide for transmitting and receiving data through, for example, a wired or wireless network such as a local area network (LAN), a metropolitan area network (MAN), and/or a wide area network (WAN), for example, the Internet.

The electronic device 300 may also include an assembly module 310. The processor 302 may be embodied as, include or otherwise control the assembly module 310. The assembly module 310 may be configured for controlling or executing the assembly operations as discussed herein.

In this regard, for example, in one embodiment a computer program product having at least one computer-readable storage medium having computer-executable program code portions stored therein is provided. The computer-executable program code portions, which may be stored in the memory device 304, may include program code instructions for performing the assembly operations disclosed herein, including one or more of the operations described above in reference to FIG. 8, and may be executed via a processor such as the processor 302.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A hinge assembly, comprising:
   a shaft comprising a cavity extending through the shaft;
   a body comprising a base engagement portion configured to engage a base of an electronic device and a shaft engagement portion engaged with the shaft and configured to allow rotation of the shaft with respect to the shaft engagement portion;
   a spring comprising a first end, a second end, and a major portion received in the cavity of the shaft, the spring being affixed to the shaft at the first end and affixed to the body at the second end; and
   a friction member disposed in an open recess of the body, the friction member coupled to one of the shaft and the body and configured to provide frictional engagement between the shaft and the body.

2. The hinge assembly of claim 1, further comprising a fixation member coupled to the body and the second end of the spring.

3. The hinge assembly of claim 1, wherein the spring comprises a torsion bar.

4. The hinge assembly of claim 1, wherein only the second end of the spring extends out of the cavity of the shaft.

5. The hinge assembly of claim 1, wherein the shaft, is configured to engage a lid of the electronic device.

6. The hinge assembly of claim 5, wherein the shaft comprises a plurality of splines at an outer surface thereof.

7. The hinge assembly of claim 1, wherein the friction member comprises at least a clip disposed in the open recess of the body.

8. An electronic device comprising:
   a base;
   a lid; and
   a hinge assembly, comprising:
      a shaft engaged with the lid, the shaft comprising a cavity extending at least partially through the shaft;
      a body comprising a base engagement portion engaged with the base and a shaft engagement portion engaged with the shaft and configured to allow rotation of the shall with respect to the base;
      a fixation member coupled to the body; and
      a spring comprising a major portion extending from a first end of the spring to an angled portion of the spring that terminates at a second end of the spring, wherein the major portion is enclosed by the cavity of the shaft, and wherein the spring is affixed to the shaft at the first end and affixed to the body at the second end, wherein the major portion is fully disposed in the cavity of the shaft, and wherein the angled portion extends out of the cavity of the shaft and forms the second end affixed to the fixation member.

9. The electronic device of claim 8, wherein the hinge assembly further comprises a friction member, the friction member being coupled to one of the shaft and the body and configured to provide frictional engagement therebetween.

10. The electronic device of claim 8, wherein the spring comprises a torsion bar.

11. The electronic device of claim 8, wherein the shaft comprises a plurality of splines at an outer surface thereof.

12. The electronic device of claim 11, wherein the lid includes a chin that includes a region that receives the plurality of splines.

13. A hinge assembly for rotating a top portion of an electronic device with respect to a bottom portion of the electronic device, the hinge assembly:
- a shaft having a cavity extending through the shaft, the shaft further having a plurality of splines on an outer surface of the shaft, the plurality of splines engaging the top portion;
- a body comprising:
  - a shaft engagement portion having a guide and an aperture within the guide, the aperture receiving the shaft; and
  - a base engagement portion affixing the body to the bottom portion;
- a clutch mechanism having a friction member coupled to the body and the shaft, the friction member having a clip, wherein when the shaft rotates, the clip frictionally engages the shaft while remaining substantially stationary with respect to the body;
- a torsion bar having a major portion positioned in the cavity and an angled portion substantially perpendicular to the major portion, the major portion having a first end affixed to and terminating at an end of the shaft that includes the plurality of splines, the angled portion having a second end; and
- a fixation member coupled to the body, the fixation member enclosing the second end of the torsion bar,
- wherein when the top portion is rotated relative to the bottom portion, the shaft and the major portion of the torsion bar rotate with the top portion and the angled portion of the torsion bar and the fixation member are substantially stationary.

14. The hinge assembly of claim 13, wherein the top portion is a lid, and the bottom portion is a base.

15. The hinge assembly of claim 14, wherein the lid includes a chin that receiving the plurality of splines.

16. The hinge assembly of claim 14, wherein the first end of the major portion of the torsion bar is affixed to the shaft by welding, brazing, crimping, or bending.

17. The hinge assembly of claim 16, wherein the shaft and the body are made from steel.

* * * * *